(12) United States Patent
    Joseph (10) Patent No.: US 10,512,138 B1
(45) Date of Patent: Dec. 17, 2019

(54) SYSTEMS AND METHODS FOR SELF LEARNING AMBIENT LIGHT SENSORS

(71) Applicant: SIGNIFY NORTH AMERICA CORPORATION, Somerset, NJ (US)

(72) Inventor: Neil Joseph, Sunnyvale, CA (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 110 days.

(21) Appl. No.: 15/265,241

(22) Filed: Sep. 14, 2016

Related U.S. Application Data (60) Provisional application No. 62/218,715, filed on Sep. 15, 2015.

(51) Int. Cl.
  *H05B 33/00* (2006.01)
  *H05B 37/02* (2006.01)

(52) U.S. Cl.
  CPC ..... *H05B 37/0218* (2013.01); *H05B 37/0272* (2013.01)

(58) Field of Classification Search
  CPC ............ H05B 33/0869; H05B 33/0872; H05B 33/0815; H05B 33/0827; H05B 37/0218; H05B 37/0272
  See application file for complete search history.

(56) References Cited

U.S. PATENT DOCUMENTS

| | | | |
|---|---|---|---|
| 8,363,707 | B2 | 1/2013 | Hollis |
| 2005/0117190 | A1 | 6/2005 | Iwauchi et al. |
| 2007/0188427 | A1 | 8/2007 | Lys et al. |
| 2007/0211013 | A1 | 9/2007 | Uehara et al. |
| 2010/0277068 | A1 | 11/2010 | Broitzman |
| 2011/0202151 | A1 | 8/2011 | Covaro et al. |
| 2012/0080944 | A1 | 4/2012 | Recker et al. |
| 2012/0170284 | A1 | 7/2012 | Shedletsky |
| 2012/0319585 | A1 | 12/2012 | Shteynberg et al. |
| 2016/0295658 | A1* | 10/2016 | Chraibi .............. H05B 33/0845 |

FOREIGN PATENT DOCUMENTS

| | | |
|---|---|---|
| WO | 2010/068538 A1 | 6/2010 |
| WO | 2013/138613 A1 | 9/2013 |

* cited by examiner

*Primary Examiner* — Monica C King
(74) *Attorney, Agent, or Firm* — Akarsh P. Belagodu (57) ABSTRACT

Systems and methods are provided for adjusting the brightness level of a lighting system based on an ambient light measurement from a lighting based sensor. Systems and methods are provided for adjusting the brightness level of a lighting system based on an ambient light measurement from a lighting based sensor. In one example, an ambient light level in a space is measured with an embedded ambient light sensor in a luminaire. The ambient light level measurement is adjusted based on a correlation of the measurement with previously stored illumination data. A brightness level is selected based on the adjusted ambient light level measurement. The space is illuminated using the chosen brightness level.

24 Claims, 11 Drawing Sheets

|  | Day 1 | Day 2 | Day 3 | Day 4 | Day 5 | Day 6 | Day 7 |
|---|---|---|---|---|---|---|---|
| Min | 0 | 0 | 0 | 0 | 0 | 0 | 0 |
| Adj-Med | 38 | 32 | 36 | 34 | 33 | 36 | 35 |
| Adj-Mean | 32 | 33 | 34 | 34 | 36 | 32 | 33 |
| Max | 62 | 58 | 64 | 62 | 55 | 60 | 62 |

SYSTEMS AND METHODS FOR SELF LEARNING AMBIENT LIGHT SENSORS

CROSS-REFERENCE TO RELATED APPLICATIONS

The present application claims priority to U.S. Provisional Patent Application No. 62/218,715, filed Sep. 15, 2015, titled "Systems and Methods for Self Learning Ambient Light Sensors" which is herein incorporated by reference.

FIELD

This disclosure is related generally to ambient light measurement and more particularly to ambient light measurement using ambient light sensors integrated into light bulbs.

BACKGROUND

A luminaire can be a lighting fixture, light bulb, lamp, lighting module, and other items that provide illumination. Some luminaires are adjustable which allows them to deliver a different light level output at different times.

SUMMARY

Systems and methods are provided for adjusting the brightness level of a lighting system based on an ambient light measurement from a lighting based sensor. In one example, an ambient light level in a space is measured with an embedded ambient light sensor in a luminaire. The ambient light level measurement is adjusted based on a correlation of the measurement with previously stored illumination data. A brightness level is selected based on the adjusted ambient light level measurement. The space is illuminated using the selected brightness level.

As another example, a lighting system is provided comprising a light source embedded in a luminaire, an ambient light sensor embedded in the luminaire, and a data processor embedded in the luminaire. The light source is configured to illuminate a space using a selected brightness level. The ambient light sensor is configured to measure an ambient light level in the space. The data processor is configured to adjust the ambient light level measurement based on a correlation of the measurement with previously stored illumination data. The data processor is further configured to select the brightness level based on the adjusted ambient light level measurement.

DETAILED DESCRIPTION

Figure 1:
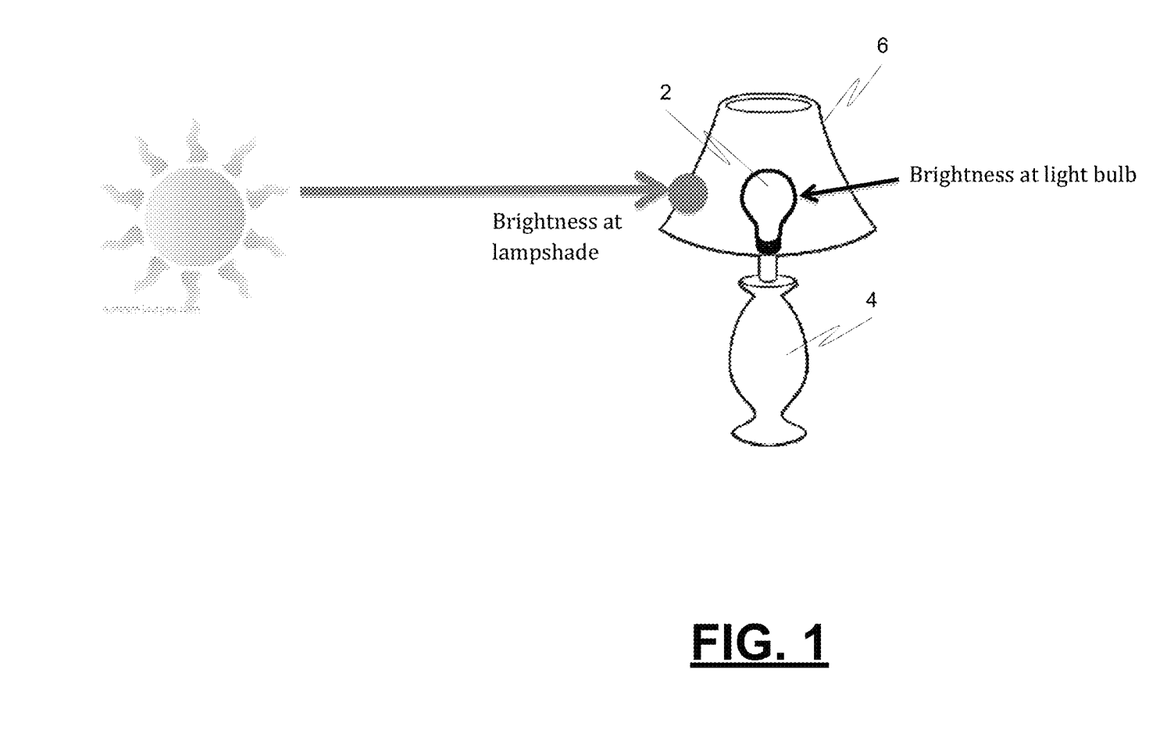
FIG. 1 is a diagram depicting a luminaire.

FIG. 1 is a diagram depicting a luminaire 2 (e.g., a light bulb) on a lamp base 4 that includes a lampshade 6. The luminaire 2 includes an embedded ambient or simple light sensor(s) (not shown) that allows the luminaire 2 to determine the ambient light in a space to be illuminated (such as a room) when the luminaire 2 is not illuminating the space. Based on ambient light level readings from the embedded ambient light sensor(s), the light output of the luminaire 2 can automatically be adjusted to output an appropriate amount of light to reduce energy waste and to reduce the likelihood that the space illuminated by the luminaire 2 becomes uncomfortable for an occupant because of too much illumination.

As illustrated in FIG. 1, the brightness level at the luminaire 2 as measured by the embedded ambient lighting sensor can be different from the brightness level in the space to be illuminated. For example, if the luminaire 2 is situated inside a fixture that obscures the actual ambient light such as a traditional lamp shade 6 or a recessed can fixture that has a diffuser underneath (not shown), the luminaire 2 may not measure the actual ambient light level in the space to be illuminated, but only the ambient light level that has made it through the fixture to the embedded sensor in the luminaire. As illustrated in FIG. 1, the brightness level of light at a lampshade may be at one level, such as 400 lux as an example, whereas the brightness level at a light bulb within the lampshade might be at another lower level, such as 200 lux as an example.

Figure 2:
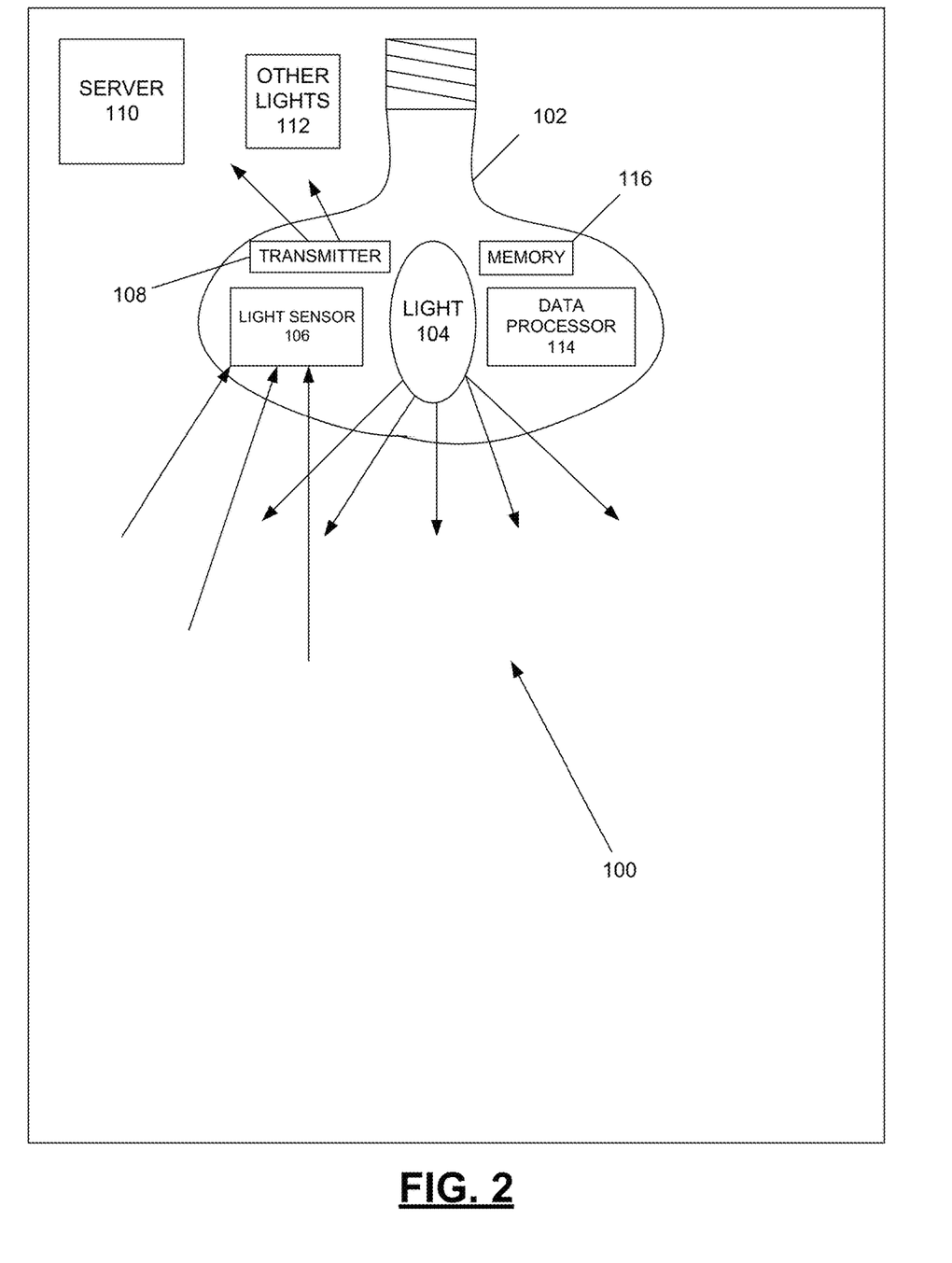
FIG. 2 is a diagram depicting a lighting system that in includes an example luminaire configured to determine an ambient light level in a space using a lighting based sensor.

FIG. 2 is a diagram depicting a lighting system 100 that in includes an example luminaire 102 configured to determine an ambient light level in a space using a lighting based sensor. A luminaire (e.g., a lighting fixture, light bulb, lamp, or light module that provides illumination) can be the most common electronic device in a building. Systems and methods as described herein can, in some embodiments, take advantage of the existing power wiring that already exists in most environments for powering luminaires to power ambient lighting sensors that are positioned within, on, or next to a lighting device. Additionally, the distributed nature of power outlets for lighting devices in buildings and other environments can be leveraged to allow for distributed ambient lighting sensors. Also, communication between lighting sensors and other devices (e.g., a server, data store, or other lighting devices) can be achieved through the use of pre-existing wireless or wired communication infrastructure (e.g., transmitting signals via power lines connected to the lighting device). Therefore, the inclusion of a lighting based sensor in a luminaire can result in the lack of a need for separate wiring for power as well as for data communication for the lighting based sensor.

The example light bulb 102 has a light source 104 integrated within the light bulb for illuminating a space. The light source 104 can take a variety of forms including incandescent, halogen, fluorescent, CFL, HID, LPS, light emitting diodes (LED), and others. The light source 104 in this example can output adjustable levels of brightness, which can be controlled for example through a dimmer. The light source 104 emits light from the bulb 102 as indicated by the arrows emanating from the light source 102 out of the bulb.

The light bulb 102 further includes an embedded ambient light sensor 106 (e.g., an active-pixel sensor (APS), bolometer, microbolometer, cadmium zinc telluride radiation detector, charge-coupled device (CCD), reverse-biased LED, photodiode light sensor, optical detector, photoresistor, light dependent resistor (LDR), and others) that can be used to measure the ambient light in a space to be illuminated (e.g., a room in a home, a portion of a warehouse or factory, etc.) as indicated by the arrows entering the light bulb 102 representing ambient light reaching the ambient light sensor 106. The ambient light sensor 106 makes ambient light measurements, and in the example of FIG. 2, can use a wireless transmitter 108 to transmit data indicative of those light measurements to outside entities, such as a server 110 and/or other lights 112 (e.g., data may be passed from light bulb to light bulb until it reaches the server, or may be passed to a light bulb that has capabilities to process the lighting data). The example light bulb 102 further includes a data processor 114 and memory 116. The data processor 114 and memory 116 can be used for processing data indicative of light measurements from the ambient light sensor 106 (e.g., adjusting the light source output based on the data), temporary storage of data indicative of light measurements from the ambient light sensor 106 (e.g., transmitting data to the server 110 in batches), storage of historical ambient light sensor data, and for processing ambient light data and historical data to adjust the light output emanating from the light source 104.

Figure 3:
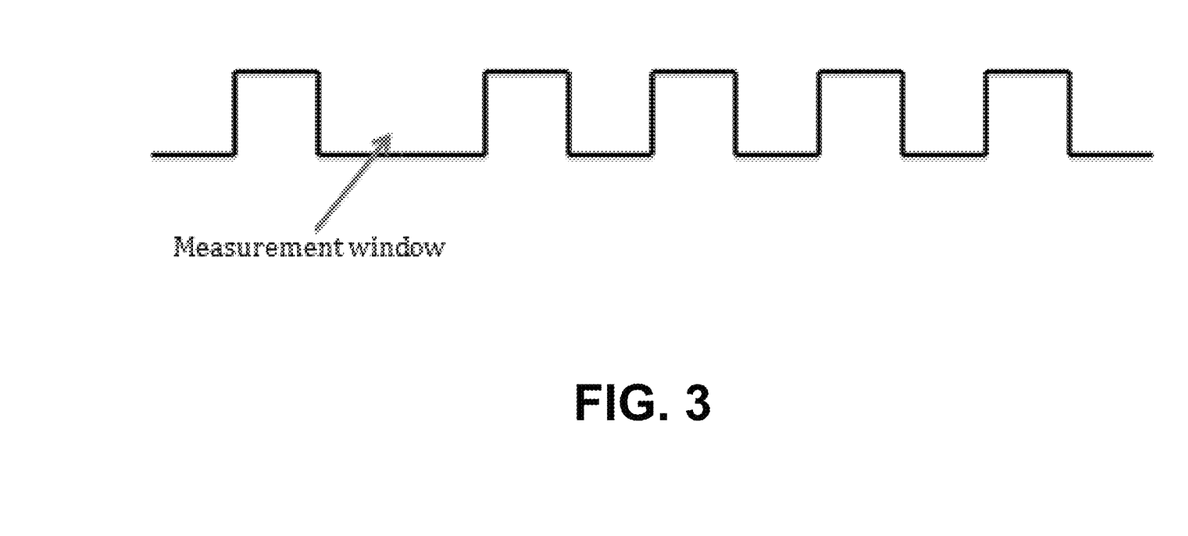
FIG. 3 is a diagram depicting an example lighting signal that can be used to periodically turn off a luminaire.

FIG. 3 is a diagram depicting an example lighting signal that can be used to periodically turn off a luminaire to allow ambient light measurements to be made without interference from light emanating from the lighting source. For example, with a luminaire that includes a light-emitting diode (LED), when the lighting signal appears at a logic high level, the LED in the luminaire is powered on and provides light. When the lighting signal appears at a logic low level, the LED in the luminaire is turned off, does not provide light, and ambient light measurements may be taken.

The ambient light measurements taken by the embedded ambient light sensor (ALS) 104 can be used by the lighting system 100 of FIG. 2 to generate illumination data for a space. This illumination data can be collected and retained to create an ambient light profile for the space illuminated by the lighting system 100. The data collection can be made within the luminaire 102, a hub or a back-end such as a cloud data store. The illumination data can be used by the luminaire in combination with instantaneous ambient light measurements from the ALS to allow the luminaire to adjust its output light level. The illumination data collection can be used to provide a contextual understanding of the proportion of light hitting the ALS compared to the actual ambient light level in the space to be illuminated.

The collection of ALS ambient light measurements and processing of the instantaneous measurement along with the illumination data collection to make adjustments to brightness, can be performed by a data processor within the luminaire, on a separate microcontroller (MCU), or on an application specific integrated circuit (ASIC) or some other device that possesses memory and calculation abilities. Thus, when performing the calculations outside of the luminaire, data may be sent to an external device such as a hub, server, cloud data store or others.

Figure 4:
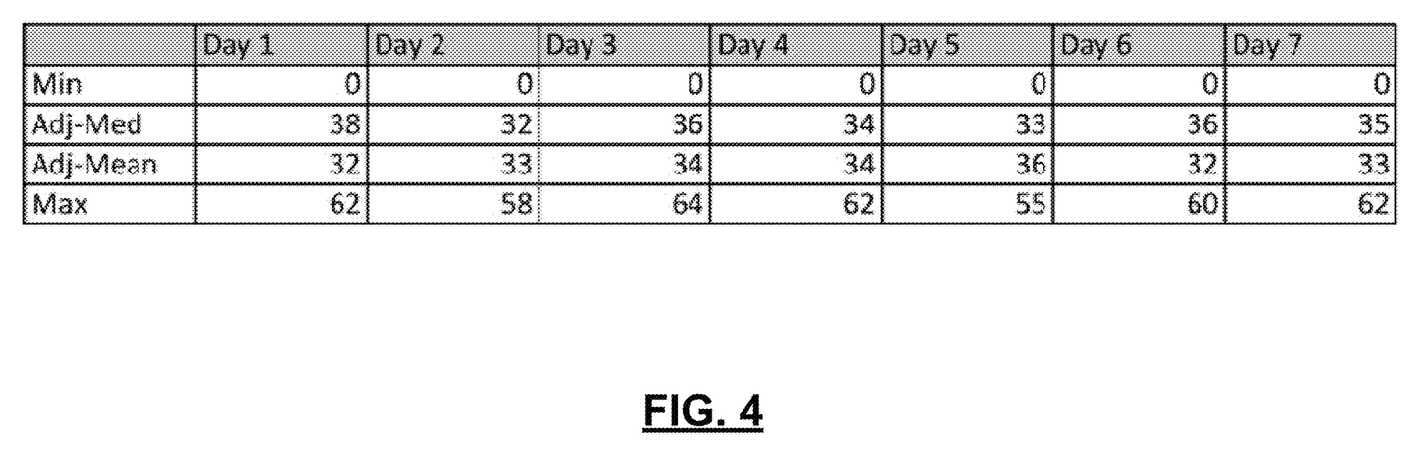
FIG. 4 is an example data structure that illustrates the type of data that may be stored in a data collection of illumination data.

Depicted in FIG. 4 is an example data structure that illustrates the type of data that may be stored in the data collection of illumination data. In this illustration, light levels in a range of 0 to 100 are used. These light levels may correlate to different light intensities such as between 300 to 600 lux.

The ambient light measurements taken by the ALS can be processed to produce illumination data. This illumination data can be collected and retained to create an ambient light profile for the space. In the example of FIG. 4, the ambient light measurements are collected and processed to generate daily illumination data that includes a minimum light level, a maximum light level, an adjusted median light level, and an adjusted mean light level for a day. The daily illumination data in this example is stored for a week as new daily illumination data is collected and stored each day. After a week, the old daily illumination data in this example is replaced by newer daily illumination data. Adjusted median and average values can be useful when all 0-value readings are removed from the data set, thereby providing a better indication of light levels when not completely dark.

Figure 5:
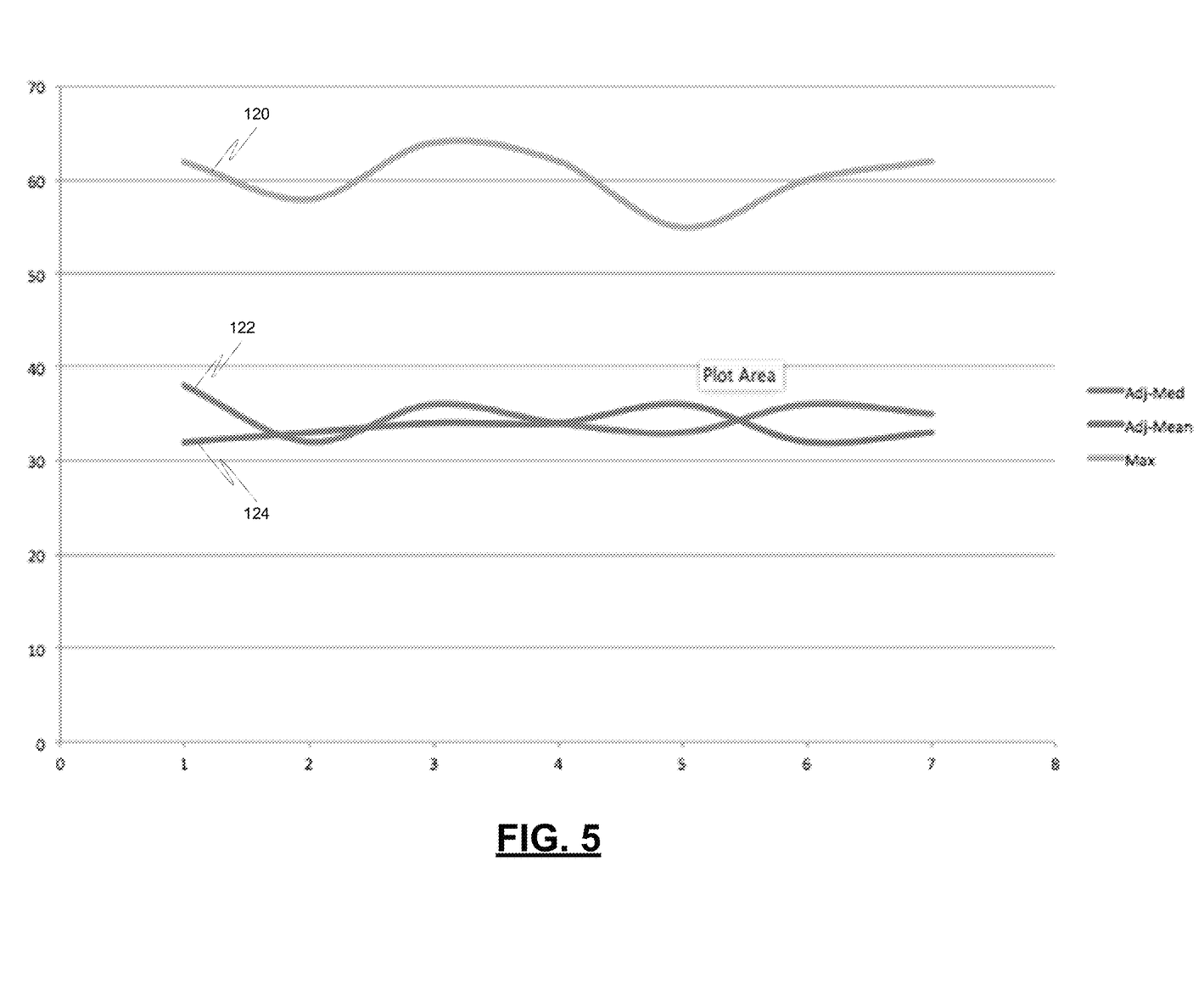
FIG. 5 is a graphical representation of daily illumination data that includes a maximum light level curve for a week, an adjusted median light level curve for a week, and an adjusted mean light level curve for a week.

Depicted in FIG. 5 is a graphical representation of daily illumination data that includes a maximum light level curve 120 for a week, an adjusted median light level curve 122 for a week, and an adjusted mean light level curve 124 for a week. In a lighting system containing multiple luminaires, illumination data and curves can be generated for each luminaire. Each luminaire can correlate its minimum, median and maximum illumination data to the time of day to allow the luminaire to check individual ALS measurements for abnormalities. After it has been determined (e.g., using statistical tests) over the course of several days (e.g., 7-days) that there are no extreme outliers in the illumination data, ALS measurements can be better mapped to light level output.

Adjustments to the brightness level of the light emitted by a luminaire may be made by correlating the instantaneous ALS ambient light measurement and the illumination data collection. The adjustment may include setting a new maximum by adjusting to the new average maximum.

Figure 6:
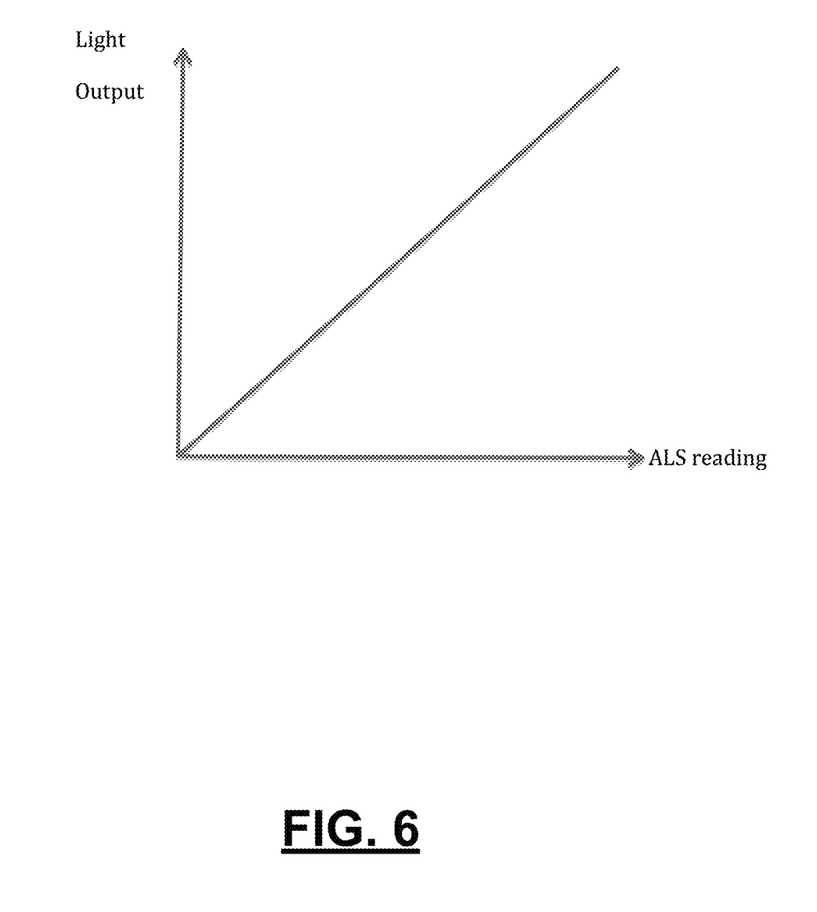
FIG. 6 is a diagram depicting an example response curve that correlates an ALS ambient light measurement to the light level to be output by the luminaire.
Figure 7:
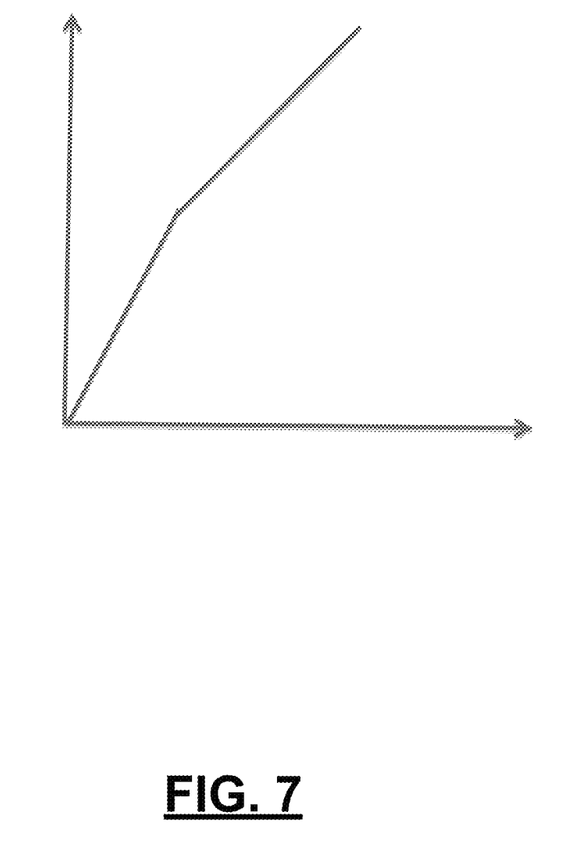
FIG. 7 is a diagram depicting another example response curve that correlates an ALS ambient light measurement to the light level to be output by the luminaire.

Depicted in FIG. 6 is a response curve that correlates an ALS ambient light measurement to the light level to be output by the luminaire. The light output from the luminaire may be directly proportional to the reading from the ALS as illustrated in this example. The shape of the response curve can also be non-linear based on the type of luminaire and the programmed light profile utilized as illustrated in FIG. 7.

Figure 8:
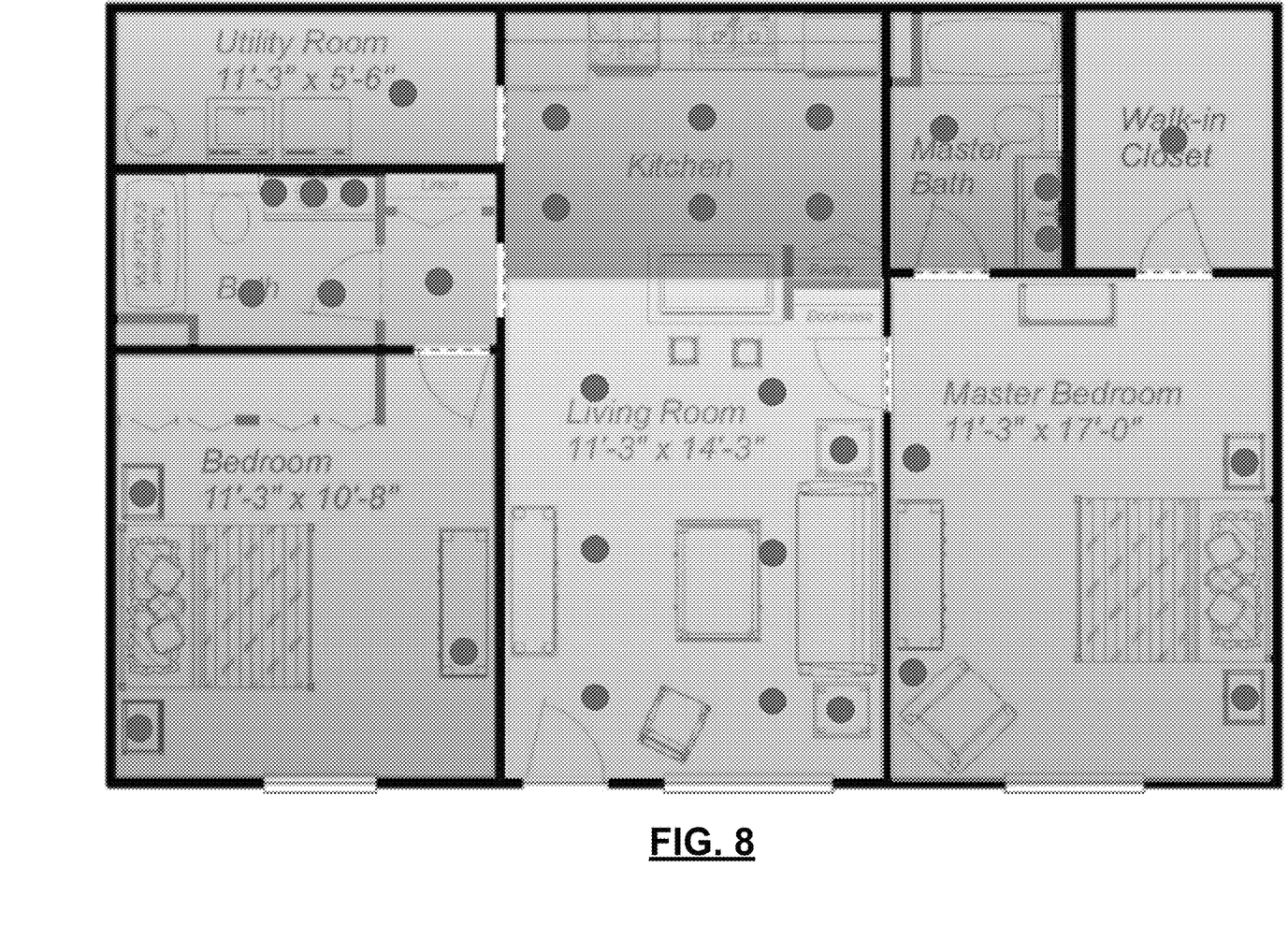
FIG. 8 is a diagram depicting a floor plan of a building containing multiple rooms and one or more luminaires in each room.

Depicted in FIG. 8 is a floor plan of a building containing multiple rooms and one or more luminaires in each room. In cases where multiple luminaires are in close proximity (such as in the same room), the luminaires may be grouped in a zone. In these cases, the illumination data for the different luminaires in the zone may be compared to check for instances of outlier data. If outlier data is present, it may suggest that the luminaire is located in an area that does not receive as much ambient light.

Light levels in each room can vary and averages can be compared across luminaires within the room or across different rooms to produce a better understanding and a more averaged response curve to ALS measurements. For example each luminaire can share its current and/or average maximum daily measurements with other luminaires and then take into account outlier luminaires that are measuring much more illumination than the remaining luminaires. This can be particularly useful in circumstances where the desired output is for all luminaires in a group to output light at the same brightness level even if one or two units measure abnormally high ambient light levels. An outlier test, e.g., using statistical measurements, can be performed to determine if a luminaire is measuring more or less ambient light than the true average for a group.

A luminaire's response curve may also be adjusted based on observed user interactions with the luminaire. For example, if a user continuously brightens a room by instructing the luminaire to output light at brightness level higher than the level directed by the luminaire's response curve, the luminaire may adjust its response curve based on the user's interactions.

Figure 9:
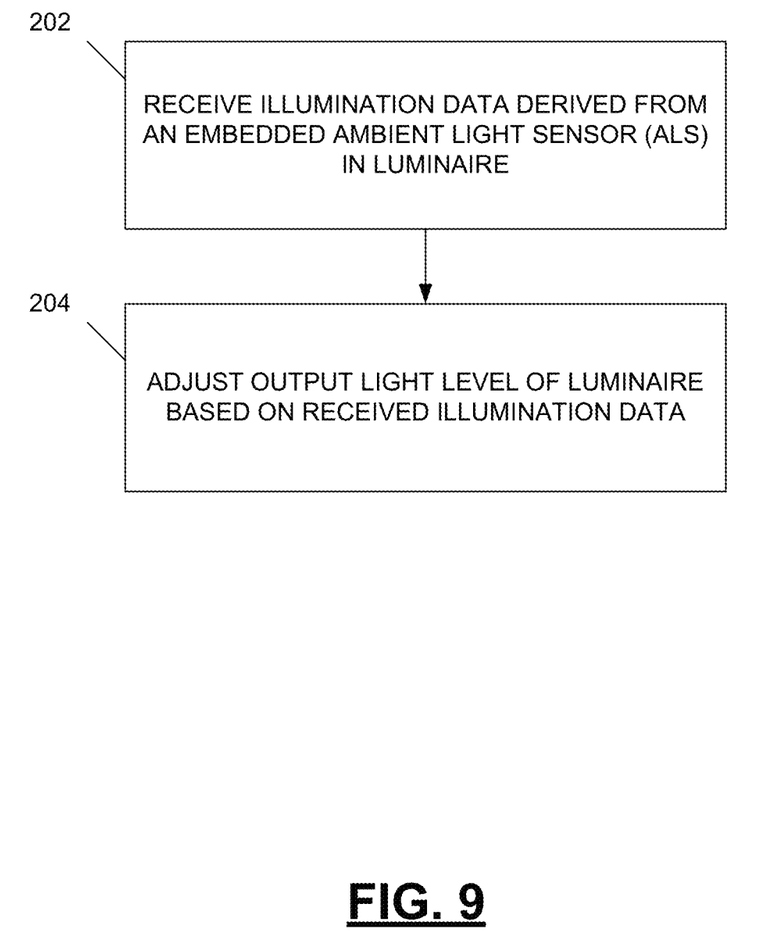
FIG. 9 is a flow diagram illustrating an example method used in a luminaire for adjusting its output light level.

Depicted in FIG. 9 is a flow chart illustrating an example method used in a luminaire for adjusting its output light level. At step 202, the luminaire receives illumination data derived from an embedded ambient light sensor in the luminaire. At step 204, the luminaire adjusts its output light level based on the received illumination data.

Figure 10:
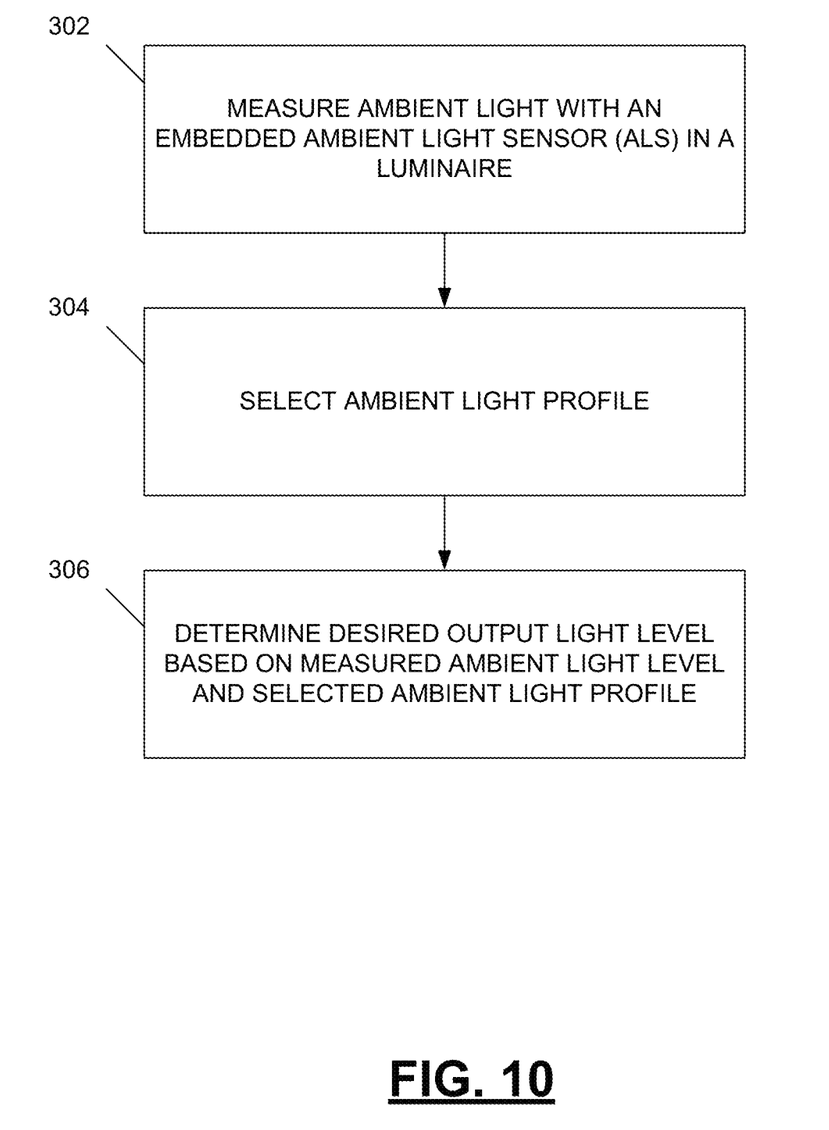
FIG. 10 is a flow diagram illustrating another example method used in a luminaire for adjusting its output light level.

Depicted in FIG. 10 is a flow chart illustrating another example method used in a luminaire for adjusting its output light level. At step 302, the luminaire measures ambient light level using an embedded ambient light sensor in the luminaire. At step 304, the luminaire selects an ambient light profile. At step 306, the luminaire determines a desired output light level based on the measured ambient light level and the selected ambient light profile.

Figure 11:
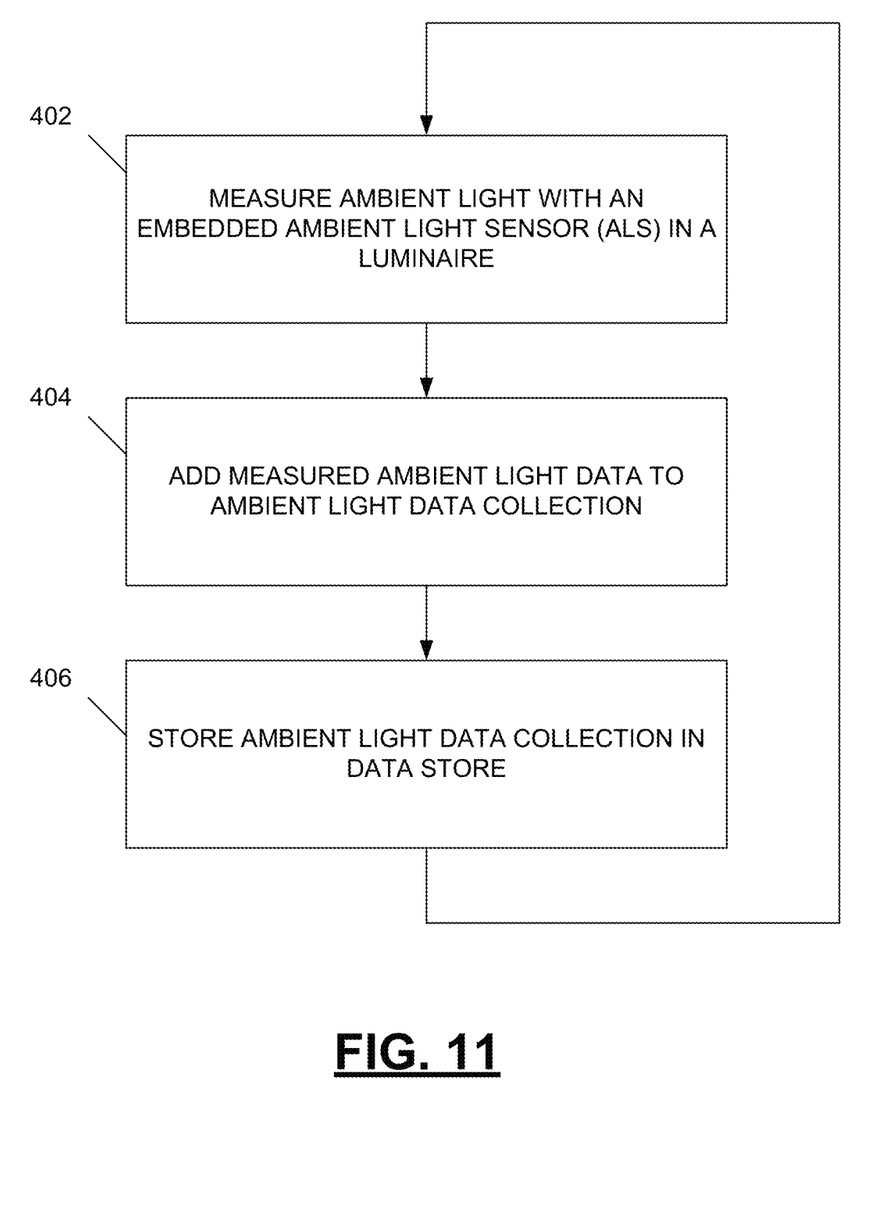
FIG. 11 is a flow diagram illustrating an example method used in a luminaire for creating an ambient light data collection.

Depicted in FIG. 11 is a flow chart illustrating an example method used in a luminaire for creating an ambient light data collection. At step 402, the luminaire measures the ambient light level using an embedded ambient light sensor in the luminaire. At step 404, the luminaire adds the measured ambient light data to an ambient light data collection for the luminaire. At step 406, the luminaire stores the ambient light data collection in a data store. These steps are repeated each day to add data to the data collection.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

It is claimed:

1. A method of adjusting the brightness level of a lighting system based on an ambient light measurement from a lighting based sensor, comprising:
   measuring an ambient light level in a space illuminated by the lighting system with an embedded ambient light sensor in a luminaire;
   adjusting the ambient light level measurement based on a correlation of the measurement with an ambient light profile for the space illuminated by the lighting system, wherein the ambient light profile is based at least in part on historical ambient light data measurements;
   selecting a brightness level based on the adjusted ambient light level measurement; and
   illuminating the space using the selected brightness level.

2. The method of claim 1, wherein the ambient light sensor is embedded in the luminaire with an embedded light source and wherein the ambient light sensor is directed to measure the ambient level when the embedded light source is not illuminated.

3. The method of claim 1, wherein the ambient light sensor is configured to communicate its ambient light level measurements to a data processor embedded in the luminaire.

4. The method of claim 3, wherein the data processor is configured to store the ambient light level measurements in a data store.

5. The method of claim 4, wherein the data store is embedded within the luminaire.

6. The method of claim 3, wherein the data processor is configured to communicate ambient light level measurements to a data processor outside of the luminaire.

7. The method of claim 3, wherein the data processor is configured to adjust the ambient light level measurement based on a correlation of the ambient light level measurement with the ambient light profile.

8. The method of claim 7, wherein the data processor is configured to generate the ambient light profile from ambient light measurements by generating daily illumination data that includes a minimum light level, a maximum light level, an adjusted median light level, and an adjusted mean light level.

9. The method of claim 7, wherein the data processor is configured to choose the brightness level based on the adjusted ambient light level measurement.

10. The method of claim 1, wherein the ambient light profile comprises daily illumination data that includes a minimum light level, a maximum light level, an adjusted median light level, and an adjusted mean light level.

11. The method of claim 1, wherein the brightness level has a non-linear relationship with the adjusted ambient light level measurement.

12. The method of claim 1, wherein the luminaire is configured to receive an adjusted ambient light level measurement from a device external to the luminaire.

13. The method of claim 3, wherein the data processor is configured to receive illumination data from another luminaire and generate the ambient light profile based at least in part on the received illumination data from another luminaire.

14. The method of claim 3, wherein the data processor is configured to receive an ambient light level measurement from another luminaire and generate the adjusted ambient light level measurement based at least in part on the received ambient light measurement from the other luminaire.

15. A lighting system comprising:
   a light source embedded in a first luminaire that is configured to illuminate a space using a selected brightness level;
   an ambient light sensor embedded in the first luminaire that is configured to measure an ambient light level in the space; and
   a data processor embedded in the first luminaire that is configured to adjust the ambient light level measurement based at least in part on a correlation of the ambient light level measurement with an ambient light profile for the space, wherein the ambient light profile is based at least in part on historical ambient light data measurements for the space, and the data processor being further configured to select the brightness level based on the adjusted ambient light level measurement.

16. The lighting system of claim 15, wherein the data processor is configured to generate the ambient light profile from ambient light measurements by generating daily illumination data that includes a minimum light level, a maximum light level, an adjusted median light level, and an adjusted mean light level.

17. The lighting system of claim 15, wherein the brightness level has a non-linear relationship with the adjusted ambient light level measurement.

18. The lighting system of claim 15, wherein the data processor is configured to receive the adjusted ambient light level measurement from a device external to the luminaire.

19. The lighting system of claim 15, wherein the data processor is configured to receive illumination data from another luminaire and generate the ambient light profile based at least in part on the received illumination data from the other luminaire.

20. The method of claim 15, wherein the data processor is configured to receive an ambient light level measurement from another luminaire and generate the adjusted ambient light level measurement based on the received ambient light measurement from the other luminaire.

21. The method of claim 1, wherein the ambient light profile comprises two or more cycles of ambient light level measurement.

22. The method of claim 21, wherein the two or more cycles span multiple separate illuminations of the lighting system.

23. The lighting system of claim 15, wherein the ambient light profile comprises two or more cycles of ambient light level measurement.

24. The lighting system of claim 23, wherein the two or more cycles span multiple separate illuminations of the lighting system.

* * * * *